US011219001B2

(12) United States Patent
Yamamoto et al.

(10) Patent No.: US 11,219,001 B2
(45) Date of Patent: Jan. 4, 2022

(54) TERMINAL, BASE STATION, AND COMMUNICATION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 16/328,550

(22) PCT Filed: Sep. 26, 2017

(86) PCT No.: PCT/JP2017/034615
§ 371 (c)(1),
(2) Date: Feb. 26, 2019

(87) PCT Pub. No.: WO2018/088043
PCT Pub. Date: May 17, 2018

(65) Prior Publication Data
US 2019/0182813 A1 Jun. 13, 2019

(30) Foreign Application Priority Data
Nov. 9, 2016 (JP) .............................. JP2016-218899

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0007* (2013.01); *H04L 5/0094* (2013.01);
(Continued)

(58) Field of Classification Search
CPC . H04L 5/0007; H04L 5/0094; H04L 27/0008; H04L 27/2636; H04L 27/2646; H04W 72/042; H04W 72/044
See application file for complete search history.

(56) References Cited

U.S. PATENT DOCUMENTS 6,853,843 B2   2/2005   Chen et al.
7,974,258 B2   7/2011   Holt
(Continued)

FOREIGN PATENT DOCUMENTS

CN      102047732 A    5/2011
EP      2259632 A1    12/2010
(Continued)

OTHER PUBLICATIONS

English Translation of WO2018083864 A1, from WIPO, retrieved from the Internet on May 26, 2021 (Year: 2021).*

(Continued)

*Primary Examiner* — Benjamin H Elliott, IV
(74) *Attorney, Agent, or Firm* — Seed IP Law Group LLP

(57) ABSTRACT

In a terminal (200), a Pre-IFFT unit (204) generates a signal waveform for multicarrier transmission (OFDM) or single carrier transmission (DFT-s-OFDM) in uplink. A transmitter (208) transmits a signal with the generated signal waveform using a resource block (PRB) allocated to the terminal (200). In this process, a restriction is imposed on the number of resource blocks for which the Pre-IFFT unit (204) is allowed to generate the signal waveform for the single carrier transmission. Thus, it is possible to efficiently switch between OFDM and DFT-s-OFDM in the signal waveform generation.

17 Claims, 4 Drawing Sheets

(51) Int. Cl.
*H04L 27/26* (2006.01)
*H04L 27/00* (2006.01)

(52) U.S. Cl.
CPC ...... *H04L 27/0008* (2013.01); *H04L 27/2636* (2013.01); *H04L 27/2646* (2013.01); *H04W 72/044* (2013.01)

(56) References Cited

U.S. PATENT DOCUMENTS

| | | | |
|---|---|---|---|
| 2008/0214126 | A1 | 9/2008 | Holt |
| 2011/0085508 | A1* | 4/2011 | Wengerter ............ H04L 5/0094 370/329 |
| 2011/0116463 | A1 | 5/2011 | Ishii et al. |
| 2011/0164532 | A1* | 7/2011 | Kawamura ........... H04L 1/0017 370/254 |
| 2012/0033587 | A1* | 2/2012 | Papasakellariou ...... H04J 13/00 370/277 |
| 2014/0112247 | A1* | 4/2014 | Chen ....................... H04W 8/24 370/328 |
| 2016/0183278 | A1 | 6/2016 | Chao |
| 2017/0126459 | A1* | 5/2017 | Dutronc .............. H04L 27/2639 |
| 2017/0264476 | A1* | 9/2017 | Yang ................... H04L 27/0008 |
| 2019/0182813 | A1* | 6/2019 | Yamamoto ............ H04L 5/0096 |
| 2019/0260498 | A1* | 8/2019 | Moroga ................ H04L 1/0003 |
| 2020/0187202 | A1* | 6/2020 | Nammi ................ H04B 17/336 |

FOREIGN PATENT DOCUMENTS

| | | |
|---|---|---|
| JP | 2009-246502 A | 10/2009 |
| JP | 2011-217383 A | 10/2011 |
| JP | 2016-529832 A | 9/2016 |
| KR | 10-2011-0007148 A | 1/2011 |
| WO | 2010/082888 A1 | 7/2010 |
| WO | WO-2018083864 A1 * 5/2018 ........ H04W 72/0406 |

OTHER PUBLICATIONS

The Extended European Search Report dated Sep. 18, 2019 for the related European Patent Application No. 17870588.5.
International Search Report of PCT application No. PCT/JP2017/034615 dated Dec. 19, 2017.
3GPP TS 36.211 V13.1.0, "3rd Generation Partnership Project; Technical Specification Group Radio Access Network; Evolved Universal Terrestrial Radio Access (E-UTRA); Physical channels and modulation (Release 13)", Mar. 29, 2016.
3GPP TS 36.212 V13.1.0, "3rd Generation Partnership Project; Technical Specification Group Radio Access Network; Evolved Universal Terrestrial Radio Access (E-UTRA); Multiplexing and channel coding (Release 13)", Mar. 29, 2016.
3GPP Ts 36.213 V13.1.1, "3rd Generation Partnership Project; Technical Specification Group Radio Access Network; Evolved Universal Terrestrial Radio Access (E-UTRA); Physical layer procedures (Release 13)", Mar. 29, 2016.
3GPP TSG RAN WG 1 Meeting #85, R1-165173, "Comparison of candidate waveforms", May 23, 2016.
3GPP TSG-RAN WG1 #85, R1-164629, "On OFDM in NR", May 23, 2016.
3GPP TSG RAN WG1 Meeting #53, R1-081791, "Technical proposals and considerations for LTE advanced", May 5, 2008.
3GPP TSG RAN WG1 Meeting #85, R1-164619, "Flexibly Configured OFDM (FC-OFDM) waveform", May 23, 2016.
3GPP TSG-RAN WG1 #86 BIS, R1-1609567, "On UL Waveforms below 40 GHz", Oct. 2016.
3GPP TS 36.211 V13.3.0, "3rd Generation Partnership Project; Technical Specification Group Radio Access Network; Evolved Universal Terrestrial Radio Access (E-UTRA); Physical channels and modulation (Release 13)", Sep. 29, 2016.
3GPP TS 36.212 V13.3.0, "3rd Generation Partnership Project; Technical Specification Group Radio Access Network; Evolved Universal Terrestrial Radio Access (E-UTRA); Multiplexing and channel coding (Release 13)", Sep. 29, 2016.
3GPP TS 36.213 V13.3.0, "3rd Generation Partnership Project; Technical Specification Group Radio Access Network; Evolved Universal Terrestrial Radio Access (E-UTRA); Physical layer procedures (Release 13)", Sep. 29, 2016.
Indian Examination Report dated Sep. 29, 2021 for the related Indian Patent Application No. 201947007425.
English Translation of Chinese Search Report dated Sep. 2, 2021 for the related Chinese Patent Application No. 201780051222.8.

* cited by examiner

TERMINAL, BASE STATION, AND COMMUNICATION METHOD

TECHNICAL FIELD

The present disclosure relates to a terminal, a base station, and a communication method.

BACKGROUND ART

With recent spread of service using mobile broadband, data traffic in mobile communication has been exponentially increasing, and thus it is an urgent need to expand the data transmission capacity for future use. It is expected that a drastic growth will occur in IoT (Internet of Things) in which everything is connected via the Internet. To support diversified services provided by IoT, dramatic sophistication is necessary not only in data transmission capacity but also in various other factors such as a low latency, a communication area (coverage), etc. In view of the background described above, technical development and standardization of 5th Generation mobile communication systems (5G) are being carried out to achieve a great improvement in performance and functionality compared with 4G (4th Generation mobile communication systems).

As one of RATs (Radio Access Technologies) of 4G, LTE (Long Term Evolution)-Advanced has been standardized by 3GPP (3rd Generation Partnership Project). In the standardizing of 5G, 3GPP is developing new radio access technology (NR (New RAT)) which will not be necessarily backward compatible to LTE-Advanced.

In 5G, it is necessary to achieve not only a further enhancement of the mobile broadband (eMBB (enhanced Mobile Broadband), but also it is necessary to support various services such as massive MTC (Machine Type Communication) (mMTC) terminals, Ultra Reliable and Low Latency Communication (URLLC), and requirements in various use cases.

In recent years, to enhance adaptability to and flexibility in various use cases of 5G, signal waveforms used in NR have been in discussion.

Techniques of generating signal waveforms according to LTE and LTE-Advanced standardized by 3GPP are described below (for example, see NPLs 1 to 3).

In LTE, OFDM (Orthogonal Frequency Division Multiplexing) is employed as a downlink waveform. A reason why OFDM is employed for downlink is because OFDM has a high resistance to frequency selective fading and has a high affinity for multilevel modulation and MIMO (Multiple Input Multiple Output). Furthermore, in OFDM, it is allowed to allocate resource blocks discontinuously in a frequency domain, and thus high flexibility is achieved in resource allocation and a scheduling effect can be expected. However, in OFDM, PAPR (Peak-to-Average Power Ratio) is high.

On the other hand, in LTE and LTE-Advanced, SC-FDMA (Single-Carrier Frequency Division Multiple Access) is employed as an uplink waveform. In SC-FDMA, signal waveform generation can be achieved by spreading using DFT (Discrete Fourier Transform), and thus it is also called DFT spread OFDM (DFT-s-OFDM). Whey DFT-s-OFDM is used for uplink is because PAPR is low, and thus DFT-s-OFDM is suitable for use with an amplifier with a high power efficiency, and it is possible to support a wide coverage.

OFDM and DFT-s-OFDM employed in LTE and LTE-Advanced have an advantage of being capable of removing intersymbol interference by inserting CP (Cyclic Prefix) and an advantage of being relatively easily realized by Fast Fourier Transform (FFT).

CITATION LIST

Non Patent Literature

NPL 1: 3GPP TS 36.211 V13.3.0, "Evolved Universal Terrestrial Radio Access (E-UTRA); Physical channels and modulation (Release 13)," September 2016.

NPL 2: 3GPP TS 36.212 V13.3.0, "Evolved Universal Terrestrial Radio Access (E-UTRA); Multiplexing and channel coding (Release 13)," September 2016.

NPL 3: 3GPP TS 36.213 V13.3.0, "Evolved Universal Terrestrial Radio Access (E-UTRA); Physical layer procedures (Release 13)," September 2016.

NPL 4: R1-165173, NTT DOCOMO, INC., "Comparison of candidate waveforms," May 2016

NPL 5: R1-164629, Ericsson, "On OFDM in NR," May 2016 NPL 6: R1-081791, Panasonic "Technical proposals and considerations for LTE advanced," May 2008

NPL 7: R1-164619, Orange, "Flexible configured OFDM (FC-OFDM) waveform," May 2016

NPL 8: R1-1609567, Nokia, Alcatel-Lucent Shanghai, "On UL Waveforms below 40 GHz," October 2016

SUMMARY OF INVENTION

In NR, there is a possibility that a plurality of terminals different in maximum transmission power are defined depending on various use cases of 5G. However, in NR, sufficient study has not been made on a signal waveform generation method that allows it to efficiently switch, in uplink, between OFDM and DFT-s-OFDM for terminals with different maximum transmission power.

In view of the above, in an aspect, the present disclosure provides a terminal, a base station, and a communication method, capable of efficiently switching between OFDM and DFT-s-OFDM in generating a signal waveform.

In an aspect, the present disclosure provides a terminal including a generator that generates a signal waveform for multicarrier transmission or single carrier transmission in uplink, wherein a restriction is imposed on the number of resource blocks for which the signal waveform for the single carrier transmission is allowed to be generated, and a transmitter that transmits a signal with the generated signal waveform using a resource block allocated to the terminal.

In an aspect, the present disclosure provides a base station including a controller that allocates an uplink resource block to a terminal, a receiver that receives a signal with a signal waveform for multicarrier transmission or a single carrier transmission mapped in the resource block, wherein a restriction is imposed on the number of resource blocks for which the terminal is allowed to generate the signal waveform for the single carrier transmission, and a demodulator that demodulates the received signal.

It should be noted that general or specific embodiments may be implemented as a system, a method, an integrated circuit, a computer program, a storage medium, or any selective combination of a system, an apparatus, a method, an integrated circuit, a computer program, and a storage medium.

The terminal, the base station, and the communication method according to the present disclosure are capable of efficiently switching between OFDM and DFT-s-OFDM in the signal waveform generation.

Additional benefits and advantages of the disclosed embodiments will become apparent from the specification and drawings. The benefits and/or effects may be individually obtained by the various embodiments and features of the specification and drawings, which need not all be provided in order to obtain one or more of such benefits and/or advantages.

DESCRIPTION OF EMBODIMENTS

Background to the Present Disclosure

First, a background to the present disclosure is described.

In studying of NR, it is supposed that OFDM or DFT-s-OFDM will be further used as a base of signal waveforms. Meanwhile, signal waveforms for supporting various use cases are in discussion. More specifically, in discussion, after a frequency domain signal is converted to a time domain signal by performing an Inverse Fast Fourier Transform (IFFT) on OFDM or DFT-s-OFDM, filtering or windowing is performed to suppress out-of-band emission (for example, see NPL 4).

It is also under discussion to use the same OFDM signal waveform for downlink of NR as that used in LTE, while OFDM is also used for uplink to achieve high frequency utilization efficiency (for example, see NPL 5). However, OFDM has a problem with a large PAPR, which results in a small coverage compared with a coverage provided by DFT-s-OFDM employed in LTE. When OFDM is used in uplink, to achieve a coverage similar to that provided by DFT-s-OFDM, a terminal needs to have a high-performance power amplifier, which results in an increase in cost of the terminal.

In view of the above, as proposed in standardization of LTE-Advanced (for example, see NPL 6), it has been proposed, also in standardization of NR of 5G, to switch the signal waveform depending on the communication environment or the like (for example, see NPL 7).

More specifically, in NPL 6, in uplink, DFT-s-OFDM and OFDM are switched depending on the communication environment. For example, a terminal located at a cell edge is in a state in which available transmission power is not high enough, and thus the terminal performs communication using DFT-s-OFDM with small PAPR. When a terminal is located close to a base station (also referred to as eNB or gNB) or located in a small cell with a small size, transmission power is high enough and thus communication is performed using OFDM. The switching between DFT-s-OFDM and OFDM can be achieved by directly inputting a modulation signal to an IFFT process unit (corresponding to OFDM) or by applying DFT spreading before the FFT process is performed (corresponding to DFT-s-OFDM).

Figure 1:
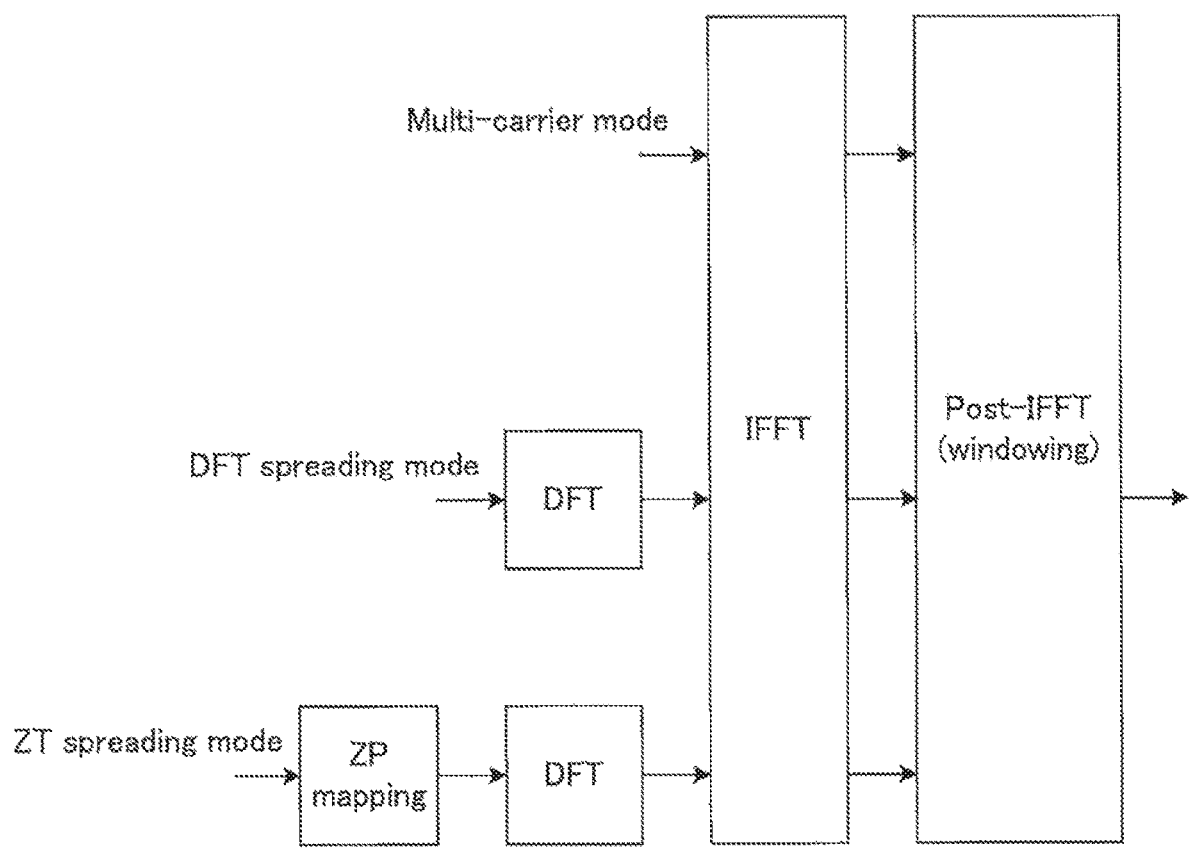
FIG. 1 is a diagram illustrating an example of a configuration of FC-OFDM.

NPL 7 discloses a signal waveform generation method (FC-OFDM: Flexible configured OFDM) in which switching is performed among OFDM (multicarrier mode), DFT-s-OFDM (DFT spreading mode), and ZT-DFT-s-OFDM (Zero-Tail DFT-s-OFDM, ZT spreading mode) which is a mode in which zero insertion process is added to DFT-s-OFDM, as shown in FIG. 1 to enhance adaptability and flexibility in various use cases of 5G. The switching among these signal waveforms can be realized, similarly in NPL 6, by directly inputting a modulation signal to an IFFT processing unit (corresponding to OFDM), applying DFT spreading before the IFFT processing is performed (corresponding to DFT-s-OFDM), or applying DFT spreading before the IFFT processing is performed (corresponding to DFT-s-OFDM) and further adding zero before the DFT spreading is performed (corresponding to ZT-DFT-s-OFDM).

For example, in uplink of eMBB, a terminal performs communication using DFT-s-OFDM with small PAPR. When a terminal is located close to a base station or located in a small cell with a small size, transmission power is high enough and thus communication is performed using OFDM.

As described above, in uplink of NR, a signal waveform generation method in which switching is performed between OFDM and DFT-s-OFDM is under discussion. By switching between OFDM and DFT-s-OFDM depending on a communication environment or the like, a terminal is capable of efficiently performing uplink transmission using a properly set signal waveform.

However, in NR, from the point of view of flexible duplex or dynamic TDD, it is desirable to enhance commonality in design between downlink transmission and uplink transmission. In this regard, if the NR uplink transmission is designed such that it is allowed to set both OFDM and DFT-s-OFDM signal waveforms for all use cases in NR uplink transmission, this design may result in a loss of commonality in design between downlink transmission based on OFDM and uplink transmission.

In view of the above, it is desirable to use the DFT-s-OFDM signal waveform only in limited use cases such as a coverage-limited environment case in which a terminal is located at a cell edge and transmission power is not sufficient. That is, it is necessary to define conditions in which it is allowed to set DFT-s-OFDM, For example, NPL 8 discloses a scheme in which a low-PAPR signal waveform such as DFT-s-OFDM is set only in a case where 1 resource block (RB: Resource Block (also referred to as PRB (Physical Resource Block)) is allocated. Why DFT-s-OFDM is allowed to be used only when one RB is allocated is because if the number of allocated RBs is increased to increase the communication speed while maintaining the transmission power at a fixed value, then a reduction occurs in transmission power spectral density in a transmission band, which causes the coverage of DFT-s-OFDM to become equal to or worse than the coverage of OFDM.

In NPL 8, maximum transmission power of a terminal is assumed to be equal to typical maximum transmission power in LTE, that is, 23 dBm. However, in NR, there is a possibility, as described above, that a plurality of terminals with different maximum transmission power are defined for various use cases of 5G. In a case where a plurality of terminals with different maximum transmission power are defined, it is not sufficient that the number of RBs for which it is allowed to set DFT-s-OFDM is limit to 1 RB. For example, in a case where maximum transmission power of a terminal is higher than 23 dBm (for example, in a case where the maximum transmission power is 30 dBm), when the number of allocated RBs is increased to improve the communication speed, DFT-s-OFDM provides better coverage than OFDM.

In view of the above, in an aspect, the present disclosure provides a terminal, a base station, and a communication method, capable of efficiently switching between OFDM and DFT-s-OFDM in signal waveform generation. More specifically, in an aspect of the present disclosure, in uplink signal waveform generation, the maximum number of RBs allowed to be allocated DFT-s-OFDM is limited, and the number of RBs is properly set. In an aspect of the present disclosure, a signal waveform is efficiently determined from the properly set number of RBs.

Embodiments of the present disclosure are described in detail below with reference to drawings.

First Embodiment

[Outline of Communication System]

In each embodiment of the present disclosure, a communication system includes a base station 100 and a terminal 200.

Figure 2:
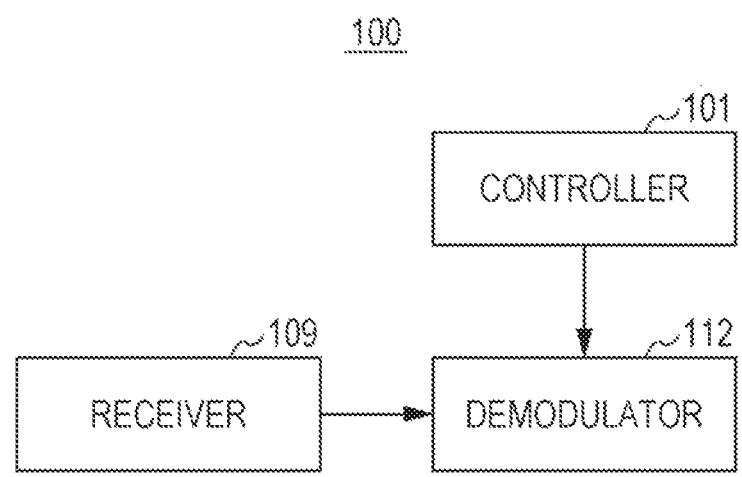
FIG. 2 is a block diagram illustrating a configuration of a main part of a base station according to a first embodiment.

FIG. 2 is a block diagram illustrating a configuration of a main part of the base station 100 according to one of embodiments of the present disclosure. In the base station 100 shown in FIG. 2, a controller 101 allocates an uplink resource block (PRB) to a terminal 200. A receiver 109 receives a signal with a signal waveform of multicarrier transmission (OFDM) or single carrier transmission (DFT-s-OFDM) allocated to the resource block, and a demodulator 112 demodulates the signal. Note that a restriction is imposed on the number of resource blocks for which the terminal 200 is allowed to generate the signal waveform of the single carrier transmission.

Figure 3:
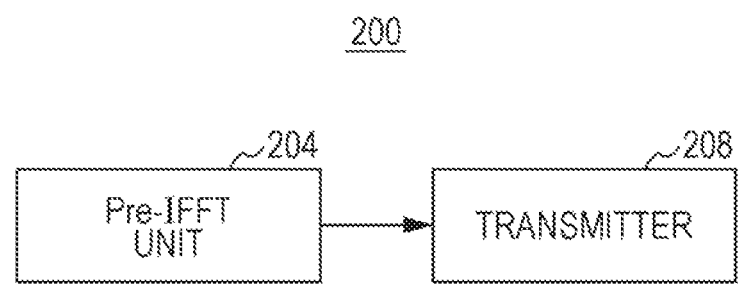
FIG. 3 is a block diagram illustrating a configuration of a main part of a terminal according to the first embodiment.

FIG. 3 is a block diagram illustrating a configuration of a main part of the terminal 200 according to one of embodiments of the present disclosure. In the terminal 200 shown in FIG. 3, a Pre-IFFT unit 204 (corresponding to the generator) generates a signal waveform of multicarrier transmission or single carrier transmission in uplink, and a transmitter 208 transmits a signal with the generated signal waveform using the resource block allocated to the terminal 200. In this process, a restriction is imposed on the number of resource blocks for which the Pre-IFFT unit 204 is allowed to generate the signal waveform of the single carrier transmission.

[Configuration of Base Station]

Figure 4:
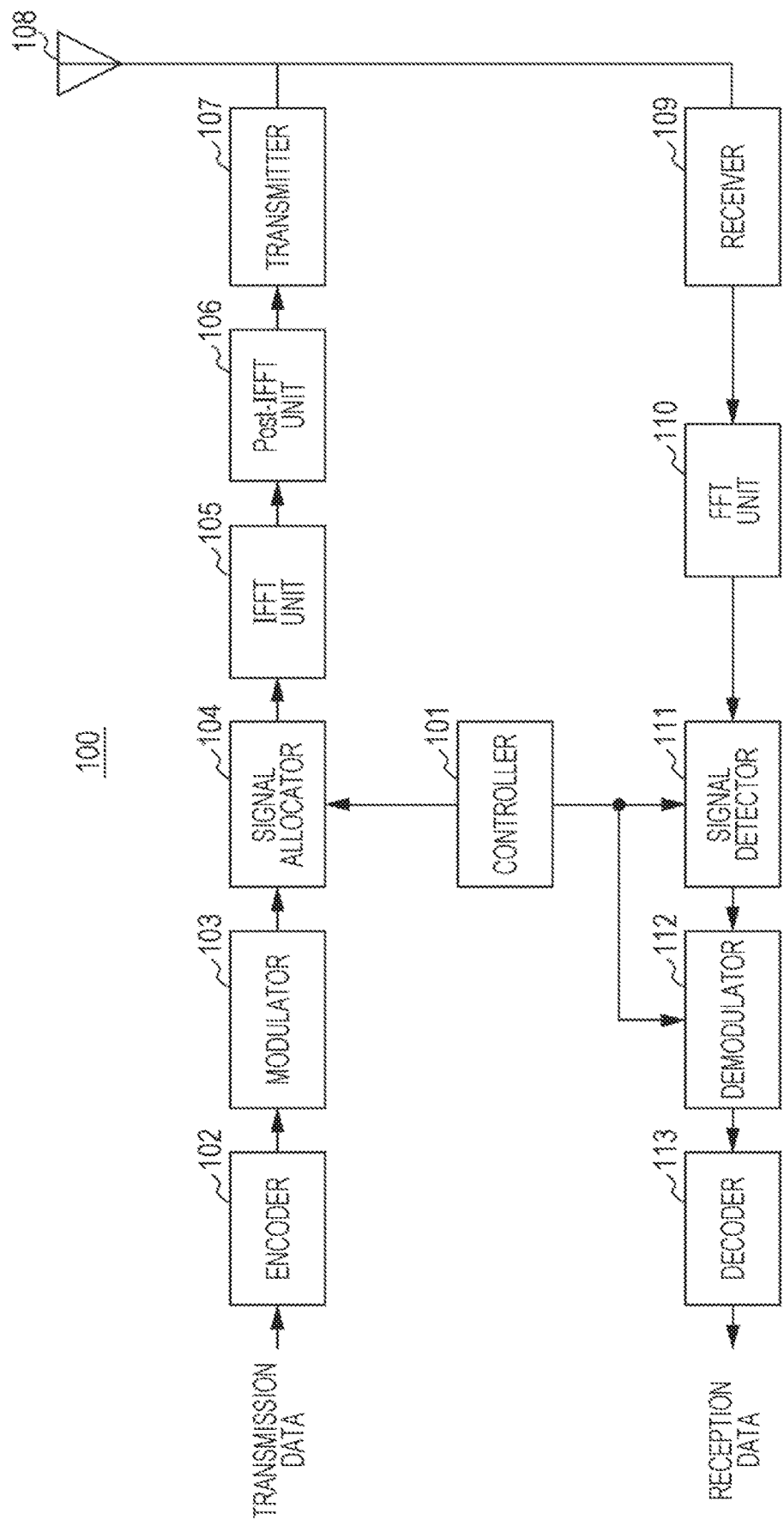
FIG. 4 is a block diagram illustrating a configuration of a base station according to the first embodiment.

FIG. 4 is a block diagram illustrating a configuration of the base station 100 according to a first embodiment of the present disclosure. In FIG. 4, the base station 100 includes a controller 101, a encoder 102, a modulator 103, a signal allocator 104, an IFFT unit 105, a Post-IFFT unit 106, a transmitter 107, an antenna 108, a receiver 109, an FFT unit 110, a signal detector 111, a demodulator 112, and a decoder 113.

The controller 101 determines downlink and uplink resource allocation (in terms of a band allocation, a bandwidth allocation, etc.) for the terminal 200, and outputs resource allocation information indicating the determined radio resource to the signal allocator 104 and the signal detector 111. The controller 101 also transmits the determined resource allocation information to the terminal 200 (the controller 201) (not shown) using a Downlink Control Information (DCI) signal or using upper layer signaling specific to the terminal.

Furthermore, the controller 101 generates information associated with a signal waveform to be generated by the terminal 200. In the present embodiment, a restriction is imposed on the number of PRBs for which the terminal 200 is allowed to generate DFT-s-OFDM (single carrier transmission) signal waveforms. For example, one value is defined as the maximum value (hereinafter, also referred to as "X") of PRBs for which a DFT-s-OFDM signal waveform is allowed to be generated. The maximum value X of PRBs for which a DFT-s-OFDM signal waveform is allowed to be generated may be defined, in advance, in specifications. The controller 101 determines the signal waveform (OFDM or DFT-s-OFDM) to be generated by the terminal 200 depending on whether the number of PRBs allocated to the terminal 200 is smaller than or equal to the maximum value X, and the controller 101 generates information indicating a result of the determination on the signal waveform. The method of determining the signal waveform based on the comparison between the allocated number of PRBs and the maximum value X will be described in further detail later.

The controller 101 determines a process for uplink reception (for example, a reception process corresponding to a Pre-IFFT process in the terminal 200) based on the information associated with the generated signal waveform, and the controller 101 outputs setting information indicating a content of the determined process to the signal detector 111 and the demodulator 112.

The controller 101 may notify the terminal 200 of the information associated with the determined signal waveform according to a predetermined notification method.

The encoder 102 decodes transmission data (downlink data) and outputs an obtained coded bit sequence to the modulator 103.

The modulator 103 demodulates a coded bit sequence input from the encoder 102 and outputs an obtained modulated symbol sequence to the signal allocator 104.

The signal allocator 104 maps the signal input from the modulator 103 to a radio resource specified by the controller 101. The signal allocator 104 outputs a mapped downlink signal to the IFFT unit 105.

The IFFT unit 105 performs an IFFT process on the signal input from the signal allocator 104 thereby converting a frequency domain signal to a time domain signal. The IFFT unit 105 outputs the time domain signal obtained via the IFFT process to the Post-IFFT unit 106.

The Post-IFFT unit 106 performs a Post-IFFT process on the signal obtained via the IFFT process and input from the IFFT unit 105, and outputs a resultant signal obtained via the Post-IFFT process to the transmitter 107. For example, in the Post-IFFT process performed by the Post-IFFT unit 106, CP is inserted in the signal input from the IFFT unit 106. The Post-IFFT unit 106 may perform windowing or filtering on the signal input from the IFFT unit 106.

The transmitter 107 and an RF (Radio Frequency) process such as a D/A (Digital-to-Analog) conversion, an up conversion or the like on the signal input from the Post-IFFT unit 106, and the transmitter 107 transmits a radio signal to the terminal 200 via the antenna 108.

The receiver 109 performs a RF process such as a down conversion or an A/D (Analog-to-Digital) conversion on the signal waveform of the uplink signal received from the terminal 200 via the antenna 108, and the receiver 109 outputs an obtained reception signal to the FFT unit 110.

The FFT unit 110 performs an FFT process on the signal (time domain signal) input from the receiver 109 thereby converting the time-domain signal to a frequency domain signal. The FFT unit 110 outputs the frequency domain signal obtained via the FFT process to the signal detector 111.

Based on setting information and resource allocation information received from the controller 101, the signal detector 111 performs an equalization process, corresponding to the signal waveform transmitted by the terminal 200, on the signal input from the FFT unit 110, and the signal detector 111 outputs the signal obtained via the equalization process to the demodulator 112.

Based on setting information received from the controller 101, the demodulator 112 performs a demodulation process (also referred to as a Post-FFT process), corresponding to the signal waveform transmitted by the terminal 200, on the signal input from the signal detector 111, and the demodulator 112 outputs a demodulated signal to the decoder 113. For example, in a case where the terminal 200 (the Pre-IFFT unit 204 described later) performs DFT spreading as the Pre-IFFT process and transmits a resultant signal, the demodulator 112 performs an IDFT (Inverse Discrete Fourier Transform) process on the signal.

The decoder 113 performs an error correction decoding process on the signal input from the demodulator 112 thereby obtaining a reception data sequence (uplink data).

[Configuration of Terminal]

Figure 5:
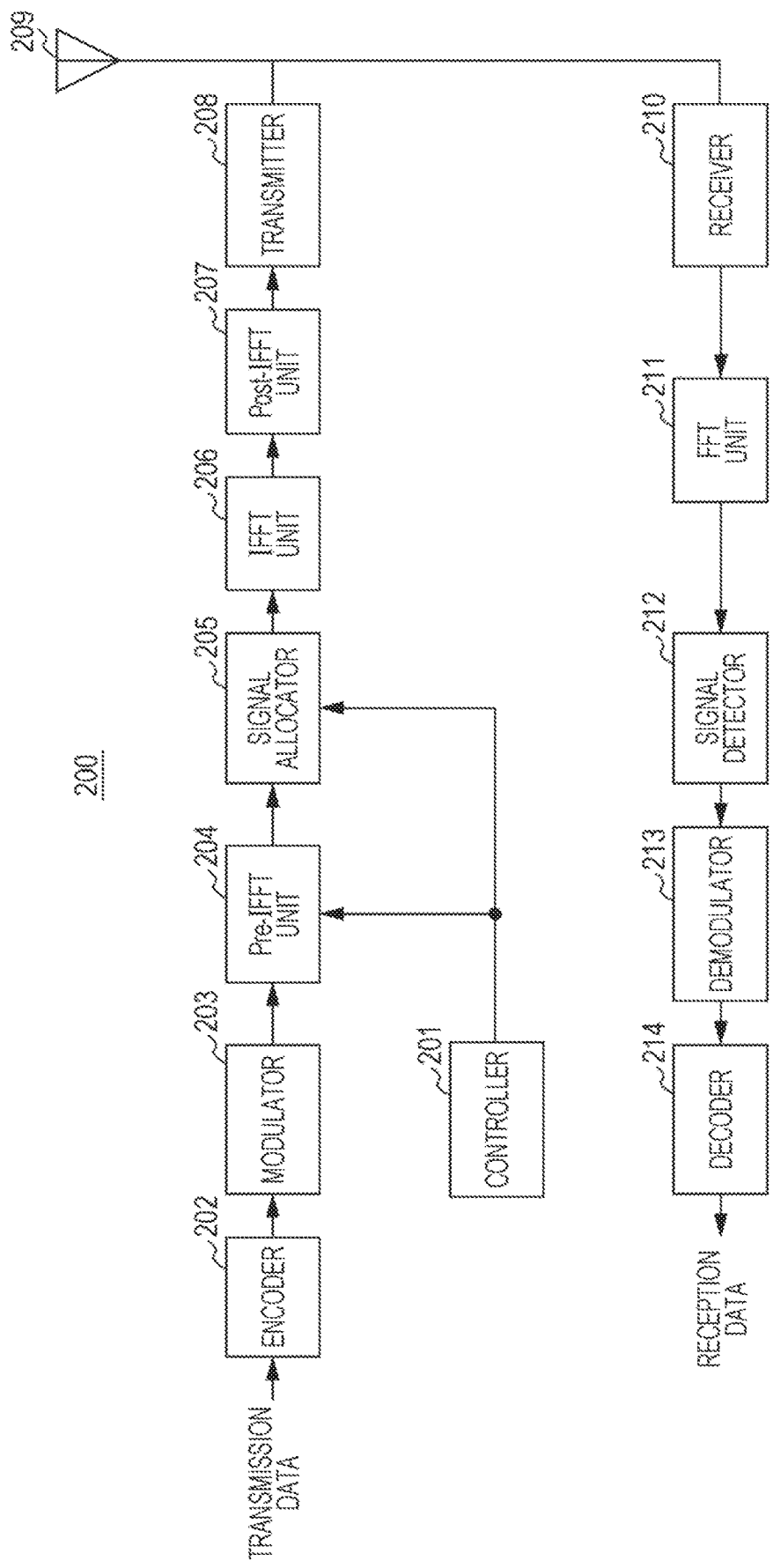
FIG. 5 is a block diagram illustrating a configuration of a terminal according to the first embodiment.

FIG. 5 is a block diagram illustrating a configuration of the terminal 200 according to the first embodiment of the present disclosure. In FIG. 5, the terminal 200 includes a controller 201, a encoder 202, a modulator 203, a Pre-IFFT unit 204, a signal allocator 205, an IFFT unit 206, a Post-IFFT unit 207, a transmitter 208, an antenna 209, a receiver 210, an FFT unit 211, a signal detector 212, a demodulator 213, and a decoder 214.

The controller 201 receives resource allocation information from the base station 100 (the controller 101) (not shown), for example, via a downlink control signal or signaling of an upper layer specific to the terminal.

The controller 201 determines a process (for example, a process of the Pre-IFFT unit 204) for uplink transmission, for example, based on the number of PRBs allocated to the terminal 200 indicated in the resource allocation information, and the controller 201 outputs setting information indicating a content of the determined process to the Pre-IFFT unit 204. More specifically, as described above, one value has been defined as the maximum value X of the number of PRBs for which the terminal 200 is allowed to generate the DFT-s-OFDM signal waveform. Therefore, the controller 201 determines the signal waveform (OFDM or DFT-s-OFDM) to be generated by the terminal 200, depending on whether the number of PRBs allocated to the terminal 200 is smaller than or equal to the maximum value X. The method of determining the signal waveform based on the comparison between the number of allocated PRBs and the maximum value X will be described in further detail later.

Note that the controller 201 may receive, from the base station 100 (not shown), information associated with the signal waveform via a downlink control signal or signaling of an upper layer specific to the terminal, and may determine the process for the uplink transmission based on the received information.

The controller 201 determines a radio resource used in transmitting the uplink signal based on the resource allocation information supplied from the base station 100 (controller 101), and the controller 201 outputs information associated with the radio resource to the signal allocator 205.

The encoder 202 codes transmission data (uplink data) and outputs an obtained coded bit sequence to the modulator 203.

The modulator 203 modulates the coded bit sequence input from the encoder 202 and outputs an obtained modulated symbol sequence to the Pre-IFFT unit 204.

The Pre-IFFT unit 204 performs a Pre-IFFT process, indicated in the setting information received from the controller 201, on the modulated symbol sequence input from the modulator 203, and the Pre-IFFT unit 204 outputs a signal obtained via the Pre-IFFT process to the signal allocator 205. For example, in a case where OFDM is designated, the Pre-IFFT unit 204 performs no process on the modulated symbol sequence and directly outputs the modulated symbol sequence to the signal allocator 205. On the other hand, in a case where DFT-s-OFDM is indicated, the Pre-IFFT unit 204 performs the DFT spreading process and outputs a sequence obtained via the DFT spreading to the signal allocator 205. Thus, the Pre-IFFT unit 204 generates a signal waveform of OFDM (multicarrier transmission) or DFT-s-OFDM (single carrier transmission) for uplink.

The signal allocator 205 maps the signal input from the Pre-IFFT unit 204 to a radio resource specified by the controller 201. The signal allocator 205 outputs a mapped uplink signal to the IFFT unit 206.

The IFFT unit 206 performs an IFFT process on the signal input from the signal allocator 205 thereby converting a frequency domain signal to a time domain signal. The IFFT unit 206 outputs the time domain signal obtained via the IFFT process to the Post-IFFT unit 207.

The Post-IFFT unit 207 performs a Post-IFFT process on the signal obtained via the IFFT process and input from the IFFT unit 206, and outputs a resultant signal obtained via the Post-IFFT process to the transmitter 208. For example, in the Post-IFFT process performed by the Post-IFFT unit 207, CP is inserted in the signal input from the IFFT unit 206. The Post-IFFT unit 207 may perform windowing or filtering on the signal input from the IFFT unit 206.

The transmitter 208 performs an RF (Radio Frequency) process such as a D/A (Digital-to-Analog) conversion, an up conversion or the like on the signal input from the Post-IFFT unit 207, and the transmitter 208 transmits a radio signal to the base station 100 via the antenna 209. Thus, the signal of the signal waveform generated by the Pre-IFFT unit 204 is transmitted using the PRBs allocated to the terminal 200.

The receiver 210 performs an RF process such as a down conversion, an A/D (Analog-to-Digital) conversion, or the like, on the signal waveform of the downlink signal received from the base station 100 via the antenna 209, and the receiver 210 outputs an obtained reception signal to the FFT unit 211.

The FFT unit 211 performs an FFT process on the signal (time domain signal) input from the receiver 210 thereby converting the time-domain signal to a frequency domain signal. The FFT unit 211 outputs the frequency domain signal obtained via the FFT process to the signal detector 212.

The signal detector 212 performs an equalization process on the signal input from the FFT unit 211 and outputs the signal obtained via the equalization process to the demodulator 213.

The demodulator 213 performs a demodulation process on the signal input from the signal detector 212, and outputs a demodulated signal to the decoder 214.

The decoder 214 performs an error correction decoding process on the signal input from the demodulator 213 thereby obtaining a reception data sequence (downlink data).

[Operations of Base Station 100 and Terminal 200]

Operations in the base station 100 and the terminal 200 configured in the above-described manner are described in detail below.

As described above, if the number of PRBs allocated to the terminal 200 is increased while maintaining the transmission power at a fixed value to enhance the communication speed, a reduction occurs in transmission power spectral density in a transmission band, which causes the coverage of DFT-s-OFDM to be equal to or worse than the coverage of OFDM.

In view of the above, in the present embodiment, a restriction is imposed on the number of allocated PRBs for which the terminal 200 is allowed to generate (use) DFT-s-OFDM. More specifically, in the present embodiment, the specifications define only one value as the maximum value X of the allocated PRBs in which the terminal 200 is allowed to use DFT-s-OFDM.

For example, the maximum value X of allocated PRBs in which the terminal 200 is allowed to use DFT-s-OFDM may be defined depending on the maximum transmission power allowed to be set for the terminal 200. For example, in a system in which the maximum transmission power of the terminal 200 is set to a value of 23 dBm, which is a typical value in LTE, the maximum value X may be set to 1 PRB. In a system in which the maximum transmission power set in the terminal 200 is higher than 23 dBm (for example, 30 dBm), the maximum value X may be set to 2 or more PRBs.

By limiting the number of allocated PRBs in which the terminal 200 is allowed to use DFT-s-OFDM, it becomes possible to design an uplink control channel, a reference signal, or the like for the terminal 200 such that the uplink control channel, the reference signal, or the like has as much commonality as possible with OFDM (that is, downlink). By defining, in the specifications, only one value as the maximum value X of allocated PRBs in which the terminal 200 is allowed to use DFT-s-OFDM, it also becomes possible to simplify the designing of the uplink signal for DFT-s-OFDM.

For example, in a case where the number of PRBs allocated to the terminal 200 is greater than X, the terminal 200 (the controller 201) determines that OFDM is employed as the uplink signal waveform, and the terminal 200 (the Pre-IFFT unit 204) generates the OFDM signal waveform. That is, the terminal 200 (the Pre-IFFT unit 204) does not perform a DFT process or the like on the signal input from the modulator 203 but the terminal 200 (the Pre-IFFT unit 204) directly outputs the signal to the signal allocator 205. In a case where the number of PRBs allocated to the terminal 200 is greater than X, the base station 100 (the controller 101) determines that OFDM is employed as the uplink signal waveform transmitted from the terminal 200, and correspondingly performs a reception process. That is, the base station 100 (the demodulator 112) performs a demodulation process on the signal input from the signal detector 113 without performing an IDFT process or the like.

On the other hand, in a case where the number of PRBs allocated to the terminal 200 is smaller than or equal to X, the terminal 200 (the controller 201) determines the uplink signal waveform according to one of two methods described below.

In a first method, in a case where the number of PRBs allocated to the terminal 200 is smaller than X, the terminal 200 determines that DFT-s-OFDM is employed as the uplink signal waveform, and the terminal 200 generates the DFT-s-OFDM signal waveform. That is, the terminal 200 (the Pre-IFFT unit 204) performs a DFT process on the signal input from the modulator 203.

This methods allows the terminal 200 to determine the signal waveform depending on the number of allocated PRBs and a threshold value (the maximum value X) defined in the specifications. Thus, the base station 100 does not need to notify the terminal 200 of setting regarding CP-OFDM and DFT-s-OFDM, which results in a reduction in signaling.

In a second method, the terminal 200 is allowed to set either one of OFDM and DFT-s-OFDM even in a case where the number of PRBs allocated to the terminal 200 is smaller than X. In this case, setting indicating which one of OFDM and DFT-s-OFDM is to be used may be notified, as information regarding the signal waveform, from the base station 100 to the terminal 200 via higher layer signaling such as an RRC (Radio Resource Control) signal or the like or via DCI indicating uplink resource allocation.

This method allows it to set the signal waveform used by the terminal 200 flexibly depending on a cell operation environment.

For example, in a case where cell uses Flexible duplex or Full duplex in operation, it is desirable to use the same signal waveform for both downlink and uplink from the point of view of controlling interference. Thus, in this case, the base station 100 sets the signal waveform transmission such that the terminal 200 uses an OFDM signal waveform similar to that used in downlink even in the case where the number of PRBs allocated to the terminal 200 is smaller than X thereby making it easy to control interference.

Furthermore, in the case where the number of PRBs allocated to the terminal 200 is smaller than X, the base station 100 (the controller 101), as with the terminal 200, may determine the uplink signal waveform transmitted from the terminal 200 using either one of the two methods described above, and may correspondingly perform the reception process. For example, in a case where the terminal 200 transmits a DFT-s-OFDM signal waveform, the demodulator 112 of the base station 100 performs the IDFT process or the like on the signal input from the signal detector 113.

As described above, in the present embodiment, in the signal waveform generation, the maximum value X of the number of allocated PRBs is set as a criterion for changing between DFT-s-OFDM and OFDM, thereby limiting use of DFT-s-OFDM by the terminal 200. For example, by defining the maximum number X may depending on the maximum transmission power of the terminal 200, it becomes possible to properly set the maximum number of PRBs in which the terminal 200 is allowed to set DFT-s-OFDM. This makes it possible for the terminal 200 to transmit the uplink signal of the DFT-s-OFDM signal waveform without causing a reduction in the coverage compared with OFDM even in a case where the number of allocated PRBs is increased, for example, to improve the communication speed. Thus, according to the present embodiment, it is possible to efficiently switch between OFDM and DFT-s-OFDM in the signal waveform generation.

Furthermore, in the present embodiment, only one value is defined in the specifications as the maximum value X of allocated PRBs in which DFT-s-OFDM is allowed to be used. This makes it possible to simplify the designing of the uplink signal using the DFT-s-OFDM signal waveform.

The terminal 200 can determine the signal waveform to be generated based on the number of PRBs allocated to the terminal 200. Thus, according to the present embodiment, the terminal 200 can efficiently determine the signal waveform from the number of PRBs, which results in suppression of an increasing in signaling related to setting of the signal waveform.

Second Embodiment

A base station and a terminal according to a second embodiment are the same in basic configuration as the base station 100 and the terminal 200 according to the first embodiment, and thus a following explanation is provided with reference to FIG. 4 and FIG. 5.

The second embodiment provides a method in which, as described below, a restriction is imposed on the number of allocated PRBs for which the terminal 200 is allowed to use DFT-s-OFDM, and a plurality of maximum values X are defined as the maximum numbers of allocated PRBs for which the terminal 200 is allowed to use DFT-s-OFDM.

As described above, if the number of PRBs allocated to the terminal 200 is increased while maintaining the transmission power at a fixed value to enhance the communication speed, a reduction occurs in transmission power spectral density in a transmission band, which causes the coverage of DFT-s-OFDM to be equal to or worse than the coverage of OFDM.

There is a particular value of the number of PRBs greater than which the coverage provided by DFT-s-OFDM becomes (is inverted) smaller than the coverage provided by OFDM when the transmission power spectral density decreases, and this particular value varies depending on the maximum transmission power of the terminal 200. That is, the number of allocated PRBs in which the terminal 200 is allowed to use DFT-s-OFDM while maintaining a coverage varies depending on the maximum transmission power of the terminal 200.

In view of the above, in the present embodiment, a plurality of values are defined, depending on the maximum transmission power of the terminal 200, as the numbers of allocated PRBs in which the terminal 200 is allowed to use DFT-s-OFDM (that is, the maximum values X of allocated PRBs). That is, the plurality of maximum values X are defined in association with the maximum transmission power of the terminal 200.

For example, in a case where the maximum transmission power of the terminal 200 is 23 dBm, X=1 PRB may be allocated, while in a case where the maximum transmission power of the terminal 200 is 30 dBm, X=4 PRBs may be allocated. That is, the greater the maximum transmission power is, the greater the maximum value X is allocated to the maximum transmission power. Note that the maximum transmission power set in the terminal 200 and the number of PRBs X defined in association with the maximum transmission power are not limited to the values described above.

By defining a plurality of values indicating the maximum numbers of allocated PRBs in which the terminal 200 is allowed to use DFT-s-OFDM, for example, it becomes possible to set proper uplink waveforms for respective terminal categories classified by maximum transmission power.

Depending on the maximum transmission power set in the terminal 200, the terminal 200 is allowed to uniquely determine the maximum value X of the number of allocated PRBs in which DFT-s-OFDM can be used. Thus, the base station 100 does not need to notify, via signaling, the terminal 200 of the maximum value X of the number of allocated PRBs in which DFT-s-OFDM is allowed to be used, which results in a reduction in signaling.

For example, as in the first embodiment, in a case where the number of PRBs allocated to the terminal 200 is greater than X, the terminal 200 (the controller 201) determines that OFDM is to be used as the uplink signal waveform, and generates the OFDM signal waveform. On the other hand, in the case where the number of PRBs allocated to the terminal 200 is greater than X, the base station 100 (the controller 101) determines that OFDM is to be used as the uplink signal waveform transmitted from the terminal 200, and correspondingly performs the reception process.

On the other hand, in a case where the number of PRBs allocated to the terminal 200 is smaller than or equal to X, the terminal 200 (the controller 201) determines the uplink signal waveform, in a similar manner as in the first embodiment, according to one of two methods described below.

In a first method, in a case where the number of PRBs allocated to the terminal 200 is smaller than X, the terminal 200 determines that DFT-s-OFDM is employed as the uplink signal waveform, and the terminal 200 generates the DFT-s-OFDM signal waveform. This method allows the terminal 200 to determine the signal waveform depending on the number of allocated PRBs and the maximum value X. Thus, the base station 100 does not need to notify the terminal 200 of setting regarding CP-OFDM and DFT-s-OFDM, which results in a reduction in signaling.

In a second method, the terminal 200 is allowed to set either one of OFDM and DFT-s-OFDM even in a case where the number of PRBs allocated to the terminal 200 is smaller than X. In this case, setting indicating which one of OFDM and DFT-s-OFDM is to be used may be notified, as information regarding the signal waveform, from the base station 100 to the terminal 200 via higher layer signaling such as an RRC signal or via DCI indicating uplink resource allocation. This method allows it to set the signal waveform used by the terminal 200 flexibly depending on a cell operation environment.

Furthermore, in the case where the number of PRBs allocated to the terminal 200 is smaller than X, the base station 100 (the controller 101), as with the terminal 200, may determine the uplink waveform transmitted from the terminal 200 using either one of the two methods described above, and may correspondingly perform the reception process.

As described above, in the present embodiment, in the signal waveform generation, a plurality of maximum values X of the number of allocated PRBs are set as criteria for changing between DFT-s-OFDM and OFDM depending on maximum transmission power set in a terminal 200 thereby limiting use of DFT-s-OFDM by the terminal 200. Thus, according to the present embodiment, even in a case where a plurality of terminal 200 with different maximum transmission power are set, each terminal 200 can properly set the uplink signal waveform depending on the maximum transmission power set in the terminal 200.

Third Embodiment

A base station and a terminal according to a third embodiment are the same in basic configuration as the base station 100 and the terminal 200 according to the first embodiment, and thus a following explanation is provided with reference to FIG. 4 and FIG. 5.

As described in the second embodiment, there is a particular value of the number of PRBs greater than which the coverage provided by DFT-s-OFDM becomes (is inverted) smaller than the coverage provided by OFDM when the transmission power spectral density decreases, and this particular value varies depending on the maximum transmission power of the terminal 200. On the other hand, the particular value of the number of PRBs greater than which the coverage provided by DFT-s-OFDM becomes smaller than the coverage provided by OFDM is not necessarily dependent only on the maximum transmission power of the terminal 200, and it is useful to set rather flexibly the number of PRBs while taking into account the maximum transmission power of the terminal 200.

In view of the above, in the third embodiment described below, as in the first and second embodiments, a restriction is imposed on the number of allocated PRBs in which the terminal 200 is allowed to use DFT-s-OFDM (that is, the maximum value X of the number of allocated PRBs), wherein the maximum value X of the number of allocated PRBs in which the terminal 200 is allowed to use DFT-s-OFDM is set by the base station 100 and notified to the terminal 200.

For example, in a case where the maximum transmission power of the terminal 200 is 23 dBm, the base station 100 may notify the terminal 200 that X=1 PRB. In a case where the maximum transmission power of the terminal 200 is 30 dBm, the base station 100 may notify the terminal 200 that X=4 PRBs. The base station 100 may set the maximum value X not only based on the maximum transmission power of the terminal 200 but also based on another parameter, or the base station 100 may set the maximum value X based on a combination of the maximum transmission power and an additional other parameter.

Examples of such additional parameters are capability (indicating whether full duplex is supported or note), reception sensitivity (SINR) in an initial cell connection process, etc.

For example, as in the first and second embodiments, in a case where the number of PRBs allocated to the terminal 200 is greater than X, the terminal 200 (the controller 201) determines that OFDM is employed as the uplink signal waveform, and the terminal 200 (the controller 201) generates the OFDM signal waveform. On the other hand, in a case where the number of PRBs allocated to the terminal 200 is greater than X, the base station 100 (the controller 101) determines that OFDM is employed as the uplink signal waveform transmitted from the terminal 200, and correspondingly performs the reception process.

In a case where the number of PRBs allocated to the terminal 200 is smaller than or equal to X, the terminal 200 (the controller 201) determines the uplink signal waveform using one of the following two methods, as in the first and second embodiments.

In a first method, in a case where the number of PRBs allocated to the terminal 200 is smaller than X, the terminal 200 determines that DFT-s-OFDM is to be used as the uplink signal waveform, and the terminal 200 generates the DFT-s-OFDM signal waveform. This method allows the terminal 200 to determine the signal waveform depending on the number of allocated PRBs and the maximum value X. Thus, the base station 100 does not need to notify the terminal 200 of setting regarding CP-OFDM and DFT-s-OFDM, which results in a reduction in signaling.

In a second method, the terminal 200 is allowed to set either one of OFDM and DFT-s-OFDM even in a case where the number of PRBs allocated to the terminal 200 is smaller than X. In this case, setting indicating which one of OFDM and DFT-s-OFDM is to be used may be notified, as information regarding the signal waveform, from the base station 100 to the terminal 200 via higher layer signaling such as a RRC signal or via DCI indicating uplink resource allocation.

This method allows it to set the signal waveform used by the terminal 200 flexibly depending on a cell operation environment.

Furthermore, in the case where the number of PRBs allocated to the terminal 200 is smaller than X, the base station 100 (the controller 101), as with the terminal 200, may determine the uplink waveform transmitted from the terminal 200 using either one of the two methods described above, and may correspondingly perform the reception process.

Note that in the present embodiment, before the base station 100 notifies the terminal 200 of the maximum value X of the number of allocated PRBs in which it is allowed to use DFT-s-OFDM, the terminal 200 is also transmits an uplink signal (for example, a random access signal or the like). In the uplink signal transmission performed before the maximum value X of the number of allocated PRBs is notified, the terminal 200 may generate a signal waveform using either DFT-s-OFDM or OFDM regardless of the number of allocated PRBs. Alternatively, the maximum number of allocated PRBs Y in which it is allowed to use DFT-s-OFDM by the terminal 200 in the uplink signal transmission performed before the maximum value X of the number of allocated PRB is notified may be defined in advance independently of X.

As described above, in the present embodiment, the maximum value X of the number of allocated PRBs, with reference to which switching between DFT-s-OFDM and OFDM is performed in the signal waveform generation, is set by the base station 100 and notified to the terminal 200. Thus, according to the present embodiment, the base station 100 can properly set the uplink signal waveform depending on the communication environment in terms of the maximum transmission power or the like associated with the terminal 200.

The present disclosure has been described above with reference to embodiments.

In the embodiments described above, it is assumed by way of example that the present disclosure is implemented using hardware. However, the present disclosure may be implemented using software in cooperation with hardware.

Each functional block according to the embodiments described above may be typically realized by an integrated circuit such as an LSI. The integrated circuit may control each functional block described above in the embodiments, and the integrated circuit may include input and output ports. Each of the functional blocks may be formed individually on one chip, or part or all of the functional blocks may be formed on one chip. The system LSI may also be referred to as an IC, an LSI circuit, a super LSI circuit, or an ultra LSI circuit depending on the degree of integration.

Furthermore, the technique of implementing the integrated circuit is not limited to the LSI, but the integrated circuit may be realized in the form of a dedicated circuit or a general-purpose processor. The integrated circuit may also be realized using an FPGA (Field Programmable Gate Array) that can be programmed after the manufacture of the LSI or a reconfigurable processor that is allowed to be reconfigured in terms of the connection or the setting of circuit cells in the inside of the LSI.

When a new integration circuit technique other than LSI techniques are realized in the future by an advance in semiconductor technology or related technology, the functional blocks may be realized using such a new technique. A possible example of a new technique is biotechnology.

A terminal according to the present disclosure includes a generator that generates a signal waveform of multicarrier transmission or single carrier transmission in uplink wherein a restriction is imposed on the number of resource blocks for which the signal waveform of the single carrier transmission is allowed to be generated, and a transmitter that transmits a signal with the generated signal waveform using a resource block allocated to the terminal.

In the terminal according to the present disclosure, one value is defined as a maximum value of the number of resource blocks in which it is allowed to generate the signal waveform for the single carrier transmission.

In the terminal according to the present disclosure, a plurality of values are defined as maximum values of the number of resource blocks in which it is allowed to generate the signal waveform for the single carrier transmission.

In the terminal according to the present disclosure, the plurality of maximum values are respectively defined in association with maximum transmission power of the terminal such that the greater the maximum transmission power, the greater the maximum value associated with the maximum transmission power.

In the terminal according to the present disclosure, the maximum value of the number of resource blocks in which it is allowed to generate the signal waveform for the single carrier transmission is set by a base station and notified to the terminal.

A base station according to the present disclosure includes a controller that allocates an uplink resource block to a terminal, a receiver that receives a signal of a signal waveform of a multicarrier transmission or a single carrier transmission mapped in the resource block wherein a restriction is imposed on the number of resource blocks for which the terminal is allowed to generate the signal waveform for the single carrier transmission, and a demodulator that demodulates the received signal.

A communication method according to the present disclosure includes generating a signal waveform of multicarrier transmission or single carrier transmission in uplink wherein a restriction is imposed on the number of resource blocks for which the signal waveform of the single carrier transmission is allowed to be generated, and transmitting a signal with the generated signal waveform using the resource block allocated to a terminal.

A communication method according to the present disclosure including allocating an uplink resource block to a terminal, receiving a signal of a signal waveform of multicarrier transmission or a single carrier transmission mapped in the resource block wherein a restriction is imposed on the number of resource blocks for which the terminal is allowed to generate the signal waveform of the single carrier transmission, and demodulating the received signal.

INDUSTRIAL APPLICABILITY

An aspect of the present disclosure is useful in a mobile communication system.

REFERENCE SIGNS LIST

100 base station
101, 201 controller
102, 202 encoder
103, 203 modulator
104, 205 signal allocator
105, 206 IFFT unit
106, 207 Post-IFFT unit
107, 208 transmitter
108, 209 antenna
109, 210 receiver
110, 211 FFT unit
111, 212 signal detector
112, 213 demodulator
113, 214 decoder
200 terminal
204 Pre-IFFT unit

The invention claimed is:

1. A terminal comprising:
a receiver, which, in operation, receives resource allocation information allocating a resource block to the terminal;
control circuitry, which, in operation, generates a signal waveform for multicarrier transmission or single carrier transmission in uplink based on the resource allocation information and a resource size threshold, wherein the control circuitry is allowed to generate the signal waveform for the single carrier transmission on condition that the allocated resource block is smaller than the resource size threshold, and the resource size threshold is set by a base station and notified to the terminal; and
a transmitter, which is coupled to the control circuitry and which, in operation, transmits a signal with the generated signal waveform using the allocated resource block,
wherein in a case that a cell, to which the terminal belongs, uses flexible duplex or full duplex, the same signal waveform is used for both downlink and uplink.

2. The terminal according to claim 1, wherein
a plurality of the resource size thresholds are defined, wherein the control circuitry is allowed to generate the signal waveform for the single carrier transmission on condition that the allocated resource block is smaller than the plurality of the resource size thresholds.

3. The terminal according to claim 2, wherein
the plurality of resource size thresholds are defined in association with maximum transmission power of the terminal such that the greater the maximum transmission power, the greater the resource size threshold associated with the maximum transmission power.

4. The terminal according to claim 1, wherein
the resource size threshold is included in downlink control information (DCI) which is notified to the terminal.

5. The terminal according to claim 1, wherein before the resource size threshold is notified to the terminal, the control circuitry generates the signal waveform for multicarrier transmission or single carrier transmission in uplink.

6. The terminal according to claim 5, wherein the control circuitry generates the signal waveform for multicarrier transmission or single carrier transmission in random access uplink transmission.

7. The terminal according to claim 1, wherein before the resource size threshold is notified to the terminal, the control circuitry is allowed to generate the signal waveform for the single carrier transmission on condition that the allocated resource block is smaller than another defined resource size threshold.

8. A base station comprising:
control circuitry, which, in operation, allocates an uplink resource block to a terminal, and sets a resource size threshold, wherein the terminal is allowed to generate a signal waveform for single carrier transmission on condition that the allocated resource block is smaller than the resource size threshold;

a transmitter, which is coupled to the control circuitry and which, in operation, transmits a notification signal indicative of the resource size threshold to the terminal; and a receiver, which is coupled to the control circuitry and which, in operation, receives a signal with a signal waveform for multicarrier transmission or the single carrier transmission in uplink, wherein in a case that a cell, to which the terminal belongs, uses flexible duplex or full duplex, the same signal waveform is used for both downlink and uplink.

9. The base station according to claim 8, wherein a plurality of the resource size thresholds are defined, wherein the terminal is allowed to generate the signal waveform for the single carrier transmission on condition that the allocated resource block is smaller than the plurality of the resource size thresholds.

10. The base station according to claim 9, wherein the plurality of resource size thresholds are defined in association with maximum transmission power of the terminal such that the greater the maximum transmission power, the greater the resource size threshold associated with the maximum transmission power.

11. A communication method implemented by a terminal, the communication method comprising:

receiving resource allocation information allocating a resource block to the terminal;

generating a signal waveform for multicarrier transmission or single carrier transmission in uplink based on the resource allocation information and a resource size threshold, wherein the terminal is allowed to generate the signal waveform for the single carrier transmission on condition that the allocated resource block is smaller than the resource size threshold, and the resource size threshold is set by a base station and notified to the terminal; and transmitting a signal with the generated signal waveform using the allocated resource block, wherein in a case that a cell, to which the terminal belongs, uses flexible duplex or full duplex, the same signal waveform is used for both downlink and uplink.

12. The communication method according to claim 11, wherein a plurality of the resource size thresholds are defined, wherein the terminal is allowed to generate the signal waveform for the single carrier transmission on condition that the allocated resource block is smaller than the plurality of the resource size thresholds.

13. The communication method according to claim 12, wherein the plurality of resource size thresholds are defined in association with maximum transmission power of the terminal such that the greater the maximum transmission power, the greater the associated with the maximum transmission power.

14. The communication method according to claim 11, wherein the resource size threshold is included in downlink control information (DCI) which is notified to the terminal.

15. A communication method implemented by a base station, the communication method comprising:

allocating an uplink resource block to a terminal;

setting a resource size threshold, wherein the terminal is allowed to generate a signal waveform for single carrier transmission on condition that the allocated resource block is smaller than the resource size threshold;

notifying the terminal of the resource size threshold; and receiving a signal with a signal waveform for multicarrier transmission or the single carrier transmission in uplink, wherein in a case that a cell, to which the terminal belongs, uses flexible duplex or full duplex, the same signal waveform is used for both downlink and uplink.

16. The communication method according to claim 15, wherein a plurality of the resource size thresholds are defined, wherein the terminal is allowed to generate the signal waveform for the single carrier transmission on condition that the allocated resource block is smaller than the plurality of the resource size thresholds.

17. The communication method according to claim 16, wherein the plurality of resource size thresholds are defined in association with maximum transmission power of the terminal such that the greater the maximum transmission power, the greater the resource size threshold associated with the maximum transmission power.

* * * * *